United States Patent [19]

Ecktman

[11] Patent Number: 4,844,429
[45] Date of Patent: Jul. 4, 1989

[54] DIE SPRING CONSTRUCTION

[75] Inventor: Jack D. Ecktman, Indianapolis, Ind.

[73] Assignee: The Firestone Tire & Rubber Company, Akron, Ohio

[21] Appl. No.: 181,807

[22] Filed: Apr. 15, 1988

Related U.S. Application Data

[63] Continuation-in-part of Ser. No. 929,124, Nov. 10, 1986, abandoned.

[51] Int. Cl.$^4$ ............................. F16F 9/04; F16F 9/36
[52] U.S. Cl. ................................ 267/64.24; 267/119; 267/130
[58] Field of Search ............ 267/119, 122, 130, 64.24, 267/64.21, 64.27; 280/698, 711, 712

[56] References Cited

U.S. PATENT DOCUMENTS

| | | |
|---|---|---|
| 894,117 | 6/1907 | Clark . |
| 1,205,106 | 11/1916 | Oxnard .............................. 267/64.24 |
| 3,157,396 | 11/1964 | Long, Jr. .......................... 267/64.24 |
| 3,596,895 | 8/1971 | Hirtreiter ......................... 267/64.24 |
| 4,078,722 | 3/1978 | Luckenbill ....................... 267/169 X |
| 4,294,324 | 10/1981 | Kimball et al. . |
| 4,378,935 | 4/1983 | Brown et al. . |
| 4,643,407 | 2/1987 | Zirk ................................... 267/64.27 |
| 4,664,362 | 5/1987 | Hennells .............................. 267/119 |
| 4,688,774 | 8/1987 | Warmuth, II ..................... 267/64.21 |
| 4,741,517 | 5/1988 | Warmuth, II et al. ...... 267/64.27 X |
| 4,741,521 | 5/1988 | Schiffner et al. ............ 267/141.2 X |

FOREIGN PATENT DOCUMENTS 0016116 1/1986 Japan ................................ 267/64.21

2186050 8/1987 United Kingdom ............. 267/64.26

Primary Examiner—Andres Kashnikow
Assistant Examiner—Richard Potosnak
Attorney, Agent, or Firm—Ronald Brietkrenz

[57] ABSTRACT

A pneumatic shock absorber used primarily as a die spring includes a piston formed with a base and an upstanding cylindrical body provided with an internal fluid reservoir. An outer housing is mounted on the base and extends about the cylindrical body. An inner housing is axially telescopically mounted for sliding movements within the outer housing. A flexible sleeve is enclosed at one end by a sealing cap and is sealingly connected at its outer end to the exterior of the piston body forming a fluid chamber therein which communicates with the fluid reservoir of the piston. An opening is formed in the piston body to fill the reservoir and chamber with a high pressure fluid which places the inner housing in an expanded position by the end cap pressing against an end wall of the inner housing upon axial expansion of the sleeve. Rolled end flanges formed on the housings engage each other to stop the movement of the inner housing at the expanded position. The inner housing moves axially within the outer housing compressing the fluid trapped in the fluid reservoir and chamber to absorb axial forces applied to the piston and inner housing. A coating of low friction material is applied to the inner surface of the inner housing and to the outer surface of the piston body to reduce the sliding and rolling friction with the flexible sleeve during axial movement of the inner housing.

11 Claims, 3 Drawing Sheets

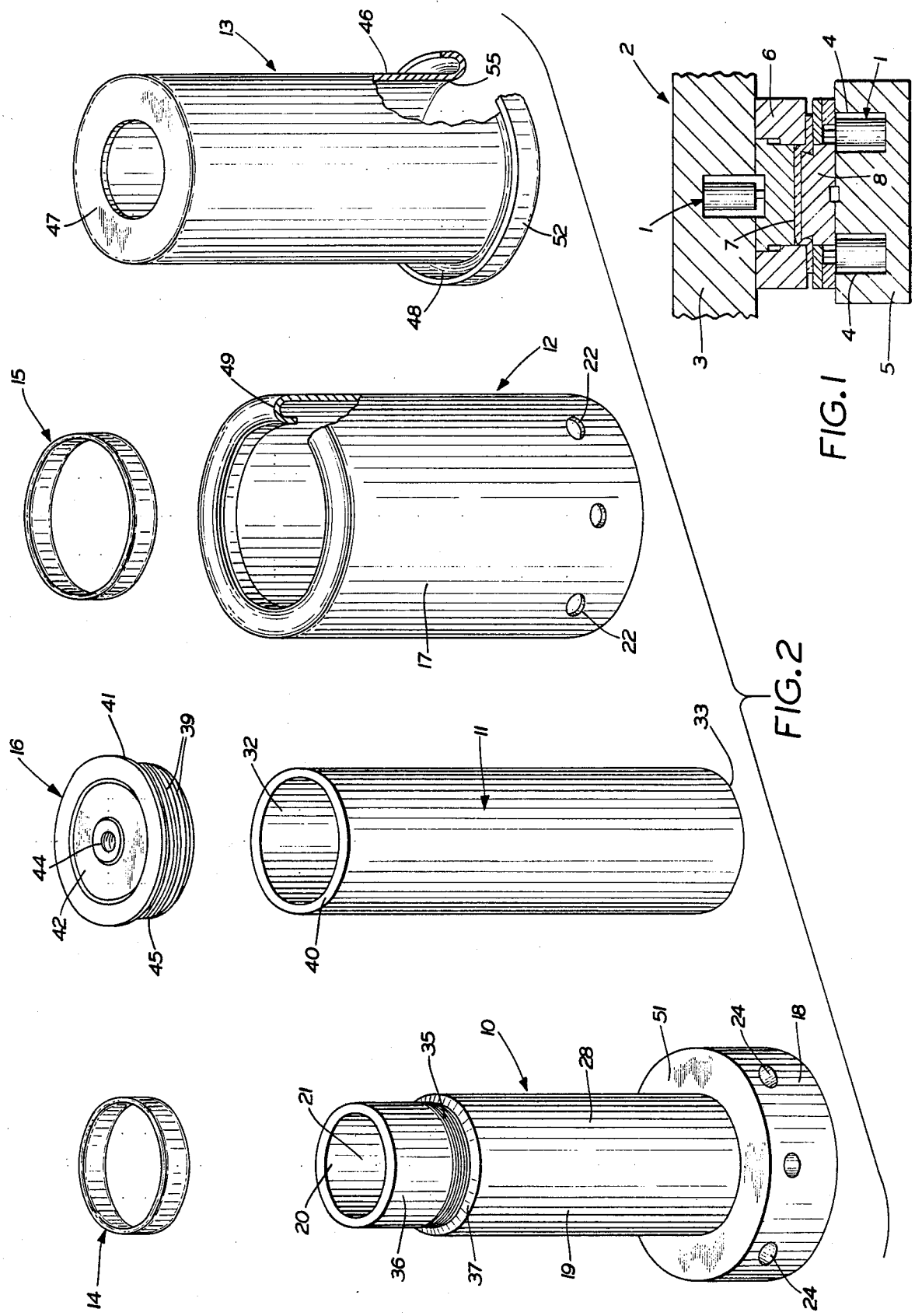

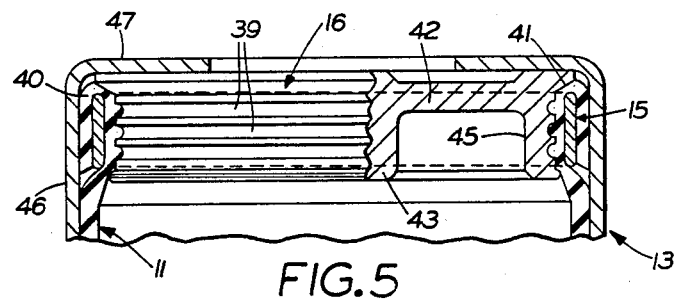
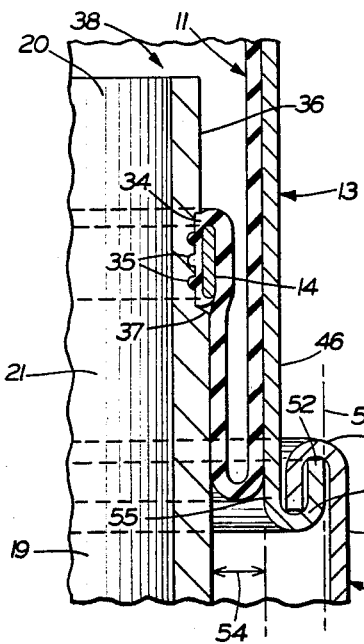
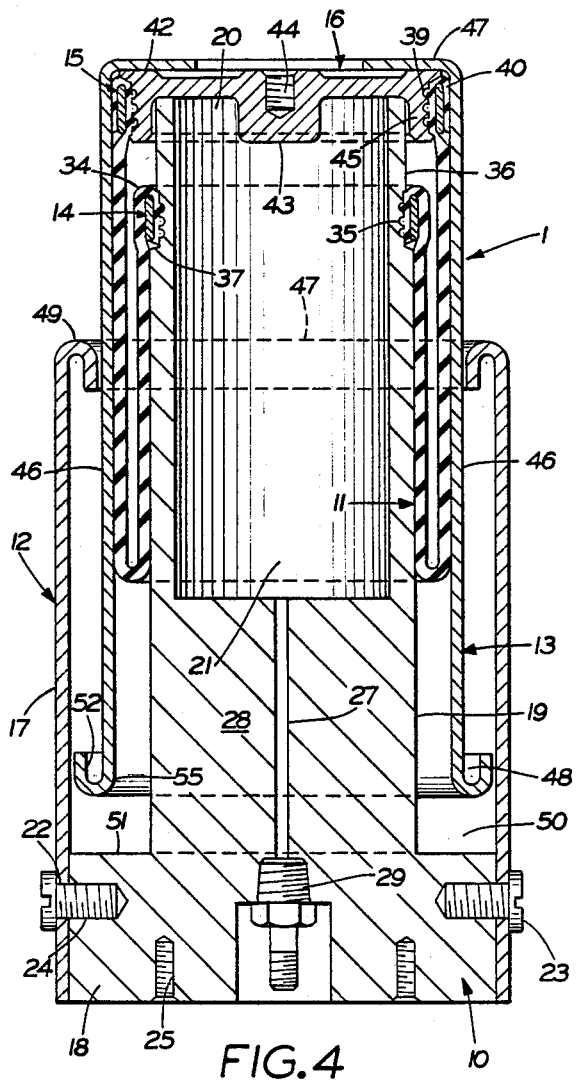
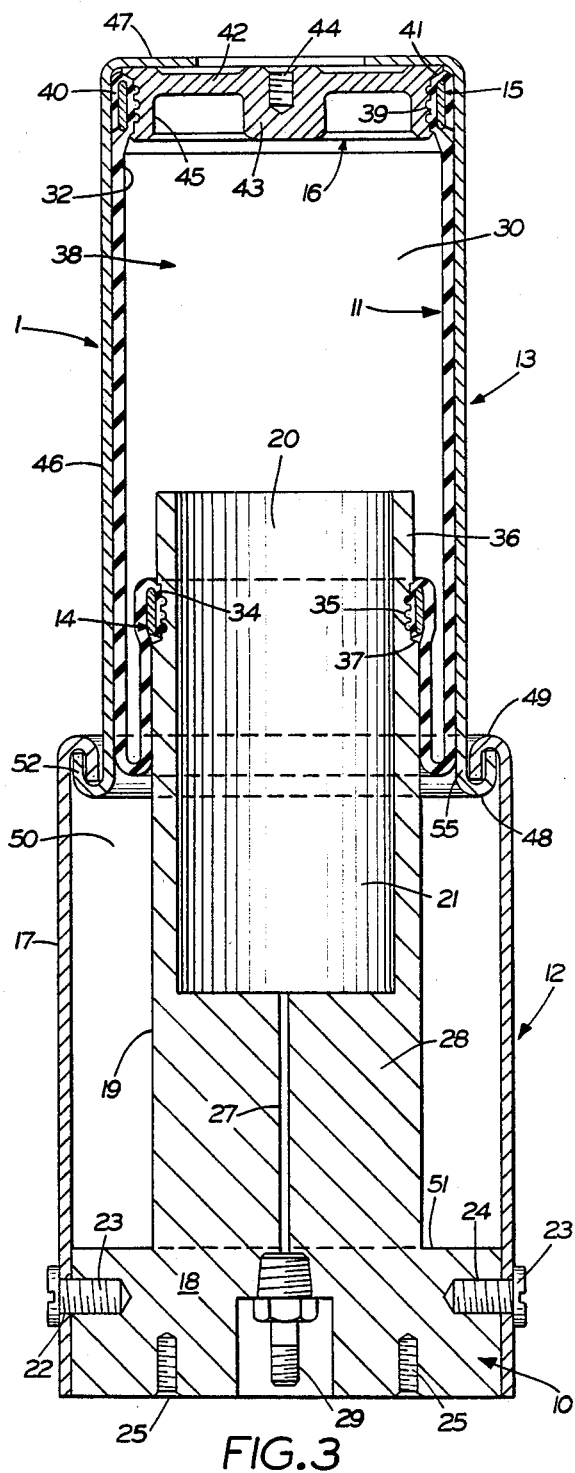

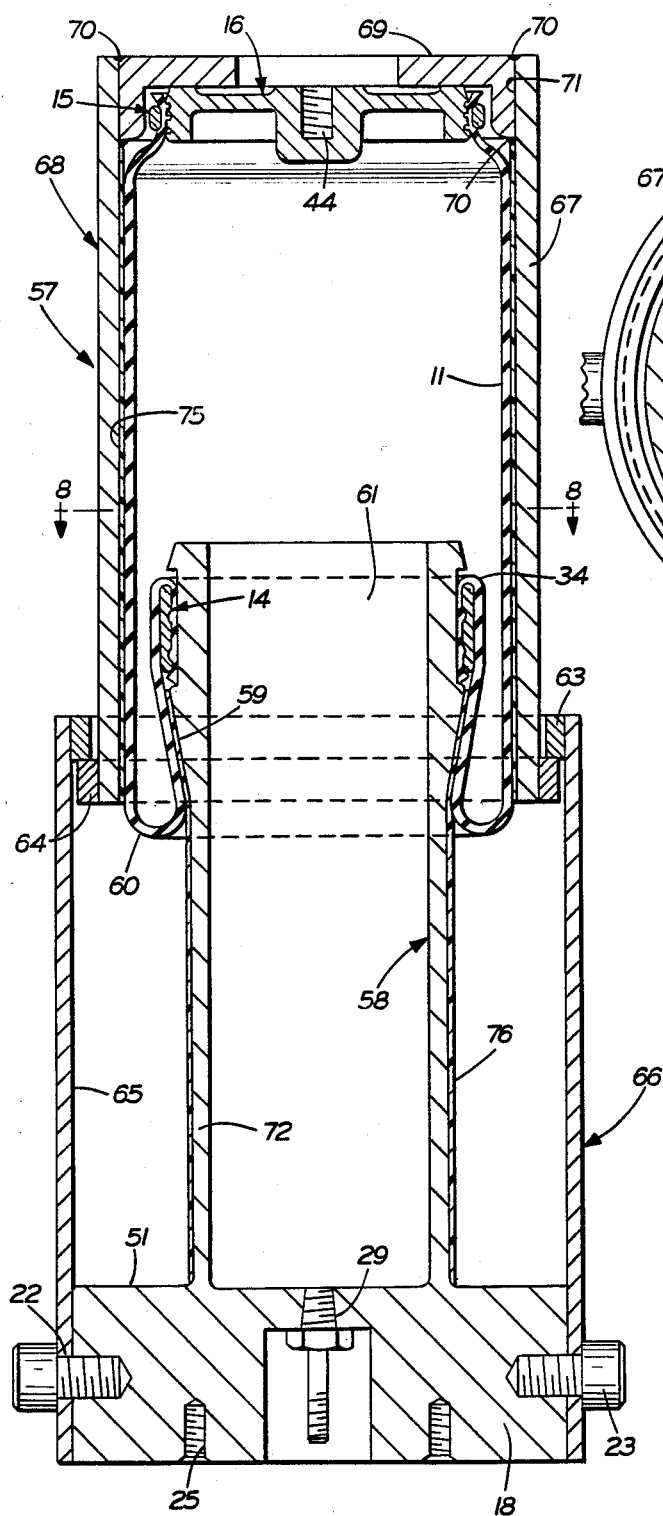
FIG. 7
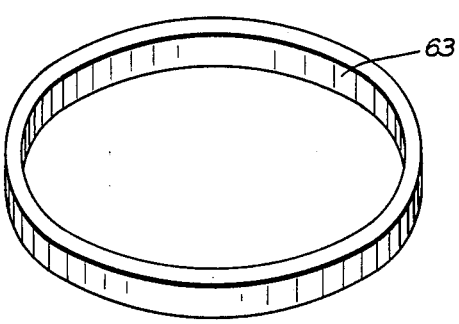
FIG. 8
FIG. 9
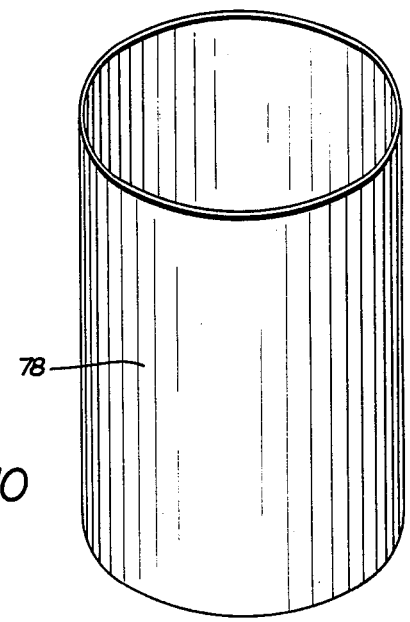
FIG. 10

DIE SPRING CONSTRUCTION

CROSS REFERENCE TO RELATED APPLICATION

The present application is a continuation-in-part of pending patent application Ser. No. 929,124 which was filed Nov. 10, 1986, now abandoned.

TECHNICAL FIELD

The invention relates to shock absorbing devices and in particular to a pneumatic spring primarily for use on a die press. More particularly, the invention relates to such a die spring able to withstand high internal fluid pressure by use of an internal flexible sleeve that eliminates the need for sliding seals.

BACKGROUND ART

Large metal working presses are used in many stamping operations and usually consist of a ram which is brought into contact with a metal part placed in a die mounted on an upper or lower platen for forming the metal into the desired shape. In certain presses the die is mounted on the moving ram. These presses impart thousands of pounds of pressure during the forming stroke to form the metal member into the desired configuration. Most of this pressure or force is absorbed by the metal. However there is always a certain amount of excess force or energy that is transferred and absorbed by the supporting die, the press platen and other components of the press. Unless the die platen, etc. are supported on resilient mounts or springs, this excess energy applied to the press quickly results in cracks and breakage of the press and various components thereof. Therefore to reduce this fatigue problem the die and/or platen as well as the hydraulic or pneumatic ram is supported on some type of shock absorbing device such as springs.

One common type of spring used in many processes is a nitrogen die spring in which a piston is slideably mounted in a cylinder containing high pressure nitrogen. The press forces or excess energy is applied to the piston rod which compresses the nitrogen within the cylinder to absorb the forces preventing their transfer directly to the press components. These nitrogen die springs possess the serious problem of requiring a sliding seal between the piston and cylinder walls. Such seals are difficult to maintain in a gas tight condition due to the high pressures of the nitrogen and the constant sliding movement of the seal along the wall of the cylinder.

Nitrogen is the desired gas for such springs since it provides a more linear compression rate than most gasses, including air, and it enables the desired results applicable at various pressures, to be easily calculated and achieved, and is not subject to breakdown or wide changes in temperatures as are other gasses. However, this requires the aditional expense of supplying and maintaining the nitrogen for the springs.

This sliding seal problem has been attempted to be eliminated by the use of self-contained die cushions which use an elastomeric bladder filled with nitrogen or other compressible gas. Although these die cushions eliminate the sliding seal problem, they require a considerable large size bladder to achieve the desired pressure which requires larger components to be built into the press or other piece of equipment for receiving the die cushion. Thus even though the sliding seal problem has been eliminated by these die cushions, they possess other undesirable characteristics, namely size vs. pressure ratio.

The other known prior art related to the present invention is disclosed in the following patents.

U.S. Pat. No. 894,117 is the closest known prior art and discloses a pneumatic suspension device using a flexible sleeve attached by a screw tightened clamping plate within the interior of an inner member with the other end of the sleeve clamped by a screw tightened plate to the inside of an outer member telescopically movably mounted with respect to the inner member. The spring of this patent requires a considerable number of components, such as stop washers, screw actuated sealing clamps, spring biased lubricating pads, expensive machined and/or cast metal parts, and requires the rolled portion of the sleeve to extend about a lower edge of a movable inner sleeve which would result in rapid wear and a short life span to the flexible sleeve.

Swiss Pat. No. 216,813 discloses a telescopic shock absorbing assembly in which a piston has a flexible bellows attached to it by an annular crimping member. The other end of the flexible member is attached at an annular ring at the bottom of the stationary lower housing. A movable upper housing telescopes outwardly about the outer housing and a flexible member rolls between the interior surface of the housing and the exterior surface of the piston.

Russian Pat. No. 423,927 discloses a flexible bellows which has an outer member which telescopes upwardly around an inner stationary member when the fluid pressure between the bellows and inner member is pressurized and expands the bellows upwardly.

One end of the bellows member is attached to a portion of a telescoping member by an annular crimping ring.

German Pat. No. 2,751,430 discloses another type of device in which a flexible bellows is attached at one end between a relatively stationary upper and lower housing and at its upper end to an annular piston plate.

None of these prior art devices are able to achieve the results of the present invention set forth below by a spring construction similar to that disclosed herein. Therefore the need exists for an improved die spring construction which is able to withstand high repeated loads exerted thereon without the use of internal sliding seals and which will enable air to be used as the compressible fluid if desired, and which can be accomplished with a considerable fewer components than required in known prior art devices.

DISCLOSURE OF THE INVENTION

Objectives of the invention include providing an improved pneumatic die spring construction primarily for use on a metal working press which duplicates the abilities of current nitrogen die springs with greater safety and at a reduced cost and with the same or similar overall dimensions.

A further objective is to provide such an improved die spring which is self-contained so as to provide a direct replacement for nitrogen die springs used on metal forming presses without requiring internal sliding seals by use of a flexible sleeve sealingly connected at one end to a piston member and at an other end to a sealing cap which is contained within an outer housing telescopically axially movably mounted within a lower housing surrounding the piston member.

A further objective of the invention is to provide such an improved die spring having a relatively high internal pressure of between 500 to 1400 psi and which can use air as the compressible gas without substantially effecting the operating characteristics thereof; in which the flexible sleeve forms an internal fluid chamber in combination with a hollow interior of the piston; and in which the piston may be connected to an external fluid source controlled by auxiliary equipment such as a regulator and surge tank to maintain a constant pressure in the fluid chamber upon the external forces being exerted thereon which enables the spring to serve as a vibration insulator, or to enable the die to be used as a dynamic pressure die in which the air is maintained entirely within the fluid chamber and compressed by the movement of the die to absorb the excess energy without requiring external pressure regulating equipment.

A still further objective of the invention is to provide such an improved die spring construction in which mechanical stops are provided on a pair of axial movable housing members surrounding the flexible sleeve to maintain the housing member in an extended or normal operating position; and in which the sealing bands which seal the ends of the flexible sleeve are arranged within the housings in such a fashion to resist the high internal pressure from disengaging the bands from the ends of the flexible sleeve.

A still further objective of the invention is to provide such an improved die spring construction which has a longer life due to the elimination of sliding seals and by providing a low friction surface on the interior of the outer metal housing and along the exterior of the piston to reduce the sliding and rolling frictional engagement with the elastomeric sleeve thereby reducing air leakage, and which has increased flexibility with regards to off-center loading, which provides a safer device and enables air to be used as the fluid medium replacing the heretofore required nitrogen; and in which the die spring components are formed of relatively inexpensive sheet metal members easily assembled to form the final spring construction.

These objectives and advantages are obtained by the improved die spring construction of the invention, the general nature of which may be stated as including a piston member having a base and an upstanding cylindrical body formed with an interior gas reservoir; an outer housing mounted on the base of the piston member and extending about at least a part of the body of said piston member; an inner housing mounted for telescopic slideable movement within the outer housing and movable from a normal extended position toward a retracted position upon an axial force being applied to the inner housing; a flexible sleeve having a pair of open ends sealingly connected at one open end to the exterior of an outer end of the piston member body and enclosed at the other end by an end cap; opening means formed in the piston member for admitting air into the reservoir; flange means on the inner and outer housings and mutually engaged with each other for stopping the sliding movement of the inner housing upon reaching the extended position and to limit lateral movement between the inner and outer housings during said sliding movement; and low friction surface means on an interior surface of the inner housing and on an outer surface of the cylindrical body of the piston member engageable with the flexible sleeve to reduce the frictional contact therebetween as the inner housing moves between the extended and retracted positions.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a diagrammatic sectional view showing a die press having three of the improved die springs mounted therein;

FIG. 2 is an exploded perspective view showing the various components of the improved die spring in disassembled condition;

FIG. 3 is an enlarged vertical sectional view of the die spring in assembled position shown in the extended or normal at-rest position;

FIG. 4 is a sectional view similar to FIG. 3 showing the die spring in a compressed position;

FIG. 5 is an enlarged fragmentary sectional view showing the end cap and sealing band sealingly connected to the upper end of the flexible sleeve;

FIG. 6 is an enlarged fragmentary sectional view showing the rolled edges of the inner and outer housings engaged with each other when the die spring is in the extended position;

FIG. 7 is a fragmentary sectional view similar to FIG. 3, showing a modified form of the improved die spring construction;

FIG. 8 is a sectional view taken on line 8—8, FIG. 7;

FIG. 9 is a perspective view of one of the stop rings removed from the modified die spring of FIGS. 7 and 8; and FIG. 10 is a perspective view of a low friction sleeve which may be incorporated into either of the die spring embodiments shown in the drawings and discussed above.

Similar numerals refer to similar parts throughout the drawings.

BEST MODE FOR CARRYING OUT THE INVENTION

The improved die spring construction is indicated generally at 1, and three of them are shown diagrammatically in FIG. 1 mounted in a die press indicated generally at 2. One of the die springs is shown mounted in the upper plate 3 of the press with two of the springs being located in cavities 4 in a lower plate 5 of the press. The upper die 6 is shown in mating engagement with a metal component 7 which is being conformed to a bottom die 8. FIG. 1 is illustrative of one type of installation in which the improved spring of the invention may be utilized but need not be limited to such an application.

The main components of improved die spring 1 are shown disassembled in FIG. 2 and consist of a piston member indicated generally at 10; a cylindrical shaped flexible sleeve formed of a elastomeric fabric reinforced material, indicated generally at 11; an outer cylindrical-shaped metal housing indicated generally at 12; an inner cylindrical-shaped metal housing indicated generally at 13; a lower and upper crimping band 14 and 15; and a sleeve sealing disc indicated generally at 16.

Referring to FIGS. 2 and 3, piston member 10 includes an annular base 18 preferably formed integrally with an upstanding piston 19 having an upper open end 20 which provides access into a hollow interior 21 which forms part of a fluid reservoir indicated generally at 38. Housing 12 has a cylindrical side wall 17 and when in assembled condition is telescopically mounted about piston 19 and is secured to annular base 18 by a plurality of attachment bolts 23 or other securing means which extend through holes 22 formed in housing wall 12 and into threaded holes 24 formed in the base. A plurality of additional threaded holes 25 may be formed in the bottom of base 18 for mounting the die spring on a piece of equipment with which it is to be used, such as within cavity 4 of the die press as shown in FIG. 1. An inlet port 27 is formed in a solid cylindrical base portion 28 of piston 19 and is adapted to be connected to a source of high pressure gas by means of a connector 29 for supplying the gas into hollow interior 21 and into the high pressure fluid chamber 30 formed by flexible sleeve 11 which collectively form fluid reservoir 38.

Flexible sleeve 11 preferably is formed of a fiber or fabric reinforced elastomeric material and has a cylindrical-shape formed with an open upper end 32 and an open bottom end 33. The lower end of sleeve 11 is telescopically mounted on the exterior surface of piston 19 and sealingly clamped thereon by crimping band 14. An inturned end 34 of sleeve 11 is pressed by crimping band 14 into a plurality of annular grooves 35 formed in a reduced diameter upper portion 36 of piston 19 adjacent an annular shoulder 37. Grooves 35 and shoulder 37 assist in retaining inturned end portion 34 of sleeve 11 in a fluid tight sealing engagement with piston portion 36 when pressed thereagainst by band 14.

Open end 32 of flexible sleeve 11 is sealed by sealing disc 16 as shown particularly in FIGS. 3 and 5. Sealing disc 16 has an annular shape with a cylindrical side wall 45 formed with a series of grooves 39 against which upper end portion 40 of sleeve 11 is clamped by annular crimping band 15 in a similar manner as is the lower end portion 34 of sleeve 11 by band 14. An annular shoulder 41 is formed above grooves 39 to assist in locking sleeve end 40 in its crimped position. End wall 42 of sealing disc 16 may be formed with a central boss 43 having a threaded hole 44 formed therein for attaching the end cap, and correspondingly the upper end of die spring 1, in an installed position when mounted in a die or other piece of equipment.

Inner housing 13 preferably is formed of stamped sheet metal and has a cylindrical side wall 46 terminating in an annular top wall 47. In accordance with one of the features of the invention the lower end of inner housing 13 is formed with an annular rolled U-shaped edge 48 which engages a similar shaped top rolled edge 49 formed on outer housing 12 (FIG. 6). The diameter of cylindrical side wall 45 of end cap 16 is generally complementary to the inside diameter of cylindrical wall 46 of inner housing 13 as shown in FIG. 5 being so configured that crimping band 15 is located therein together with the rolled end portion 40 of sleeve 11. This relationship assists in maintaining the sealing engagement of the sleeve end with grooves 39 since the extreme high pressure of the fluid within fluid reservoir 38 in attempting to escape will force sleeve end 40 and band 15 outwardly against wall 46 but is prevented by rigid wall 46 from movement. Thus, rolled end 40 of sleeve 11 in addition to being rigidly clamped against sealing disc 16 by band 15, is further retained by the relationship of the inner surface of inner housing wall 46 and band 15.

Improved die spring 1 is constructed in a relatively simple manner preferably by first crimping sleeve 11 to piston 19 by sealing band 14 and then to sealing disc 16 by band 15. Next the sleeve will be collapsed around the piston in a manner shown in FIG. 4. Outer housing 12 then is slipped over inner housing 13 and then the combined housings are slipped down over the collapsed sleeve and then secured to piston base 18 by bolts 23.

The operation of improved die spring 1 is best illustrated in FIGS. 1, 3 and 4. Fluid reservoir 38 will contain a supply of compressed air which is injected therein through inlet port 27. Although air is preferred as the compression fluid, other types of gasses such as nitrogen can be used without effecting the concept of the invention. Therefore the invention need not be limited to the use of air although the same is preferred due to its availability and reduced cost with respect to other types of fluids.

When in the pressurized position of FIG. 3, referred to as the normal, at-rest or extended positio, the pressure acting upon sealing disc 16 will move disc 16 axially within inner housing 13 into abutting engagement with top wall 47 thereof moving housing 13 to the extended position of FIG. 3. Housing 13 is maintained in this extended position by the internal fluid pressure and by the engagement of rolled edges 48 and 49 which serves as stops to limit the movement of inner housing 13 upon reaching its extended position.

The operation, features and advantages of the improved die spring is best illustrated in FIGS. 3 and 4. Upon a generally axial force being applied either to end wall 47 of inner housing 13 or to the base of piston member 10, inner housing 13 will move into annular space 50 formed between cylindrical wall 17 of outer housing 12 and piston 19, with sleeve 11 moving downwardly along the outer surface of piston 19 as shown in FIG. 4. The fluid contained within the fluid reservoir 38 is compressed absorbing the energy applied to spring 1. The internal pressure of the compressed fluid then will automatically return inner housing 13 to the extended position of FIG. 3 upon removal of the axial force exerted thereon.

In certain applications, auxiliary equipment such as a surge tank regulator or the like will be attached to connector 29 through appropriate conduits which would insure that a constant pressure is maintained within fluid chamber 38 instead of permitting an unlimited compression of the fluid contained therein. For either application, die spring 1 performs its intended function. Also, rolled edge 48 of inner housing 13 will contact annular shoulder 51 of base 18 to provide a positive mechanical stop to prevent damage to sleeve 11 and the sealing connections thereof should the force applied to the die spring be large enough to cause the die to bottom out in an unusual situation since the die is designed that the fluid will absorb the applied force preventing such contact.

The particular relationship between outer and inner housings 12 and 13, respectively, provides a stable die spring able to withstand some degree of monoaxially applied forces and provides an extremely safe and efficient device. The outer diameter of annular rolled edge 48 of inner housing 13 indicated by imaginary line 53 (FIG. 6), is almost equal to the inside diameter of cylindrical wall 17 of outer housing 12. This relationship prevents excess lateral movement of inner housing 13 with respect to outer housing 12 and transmits any off center forces applied thereto in a generally axial direction.

Also the inside diameter of inner housing 13, that is of cylindrical side wall 46 is sufficiently large to provide a sufficient distance from the side wall of piston 19 to permit sleeve 11 to extend and fold thereabout as shown in FIG. 4. This distance represented by arrow 54 in FIG. 6 being greater than the spacing between the outer end of rolled end 48 and inside surface of outer housing wall 17, insures that any off centered forces applied to the housings will cause upwardly extending flange 52 of rolled edge 48 to engage the inner surface of side wall 17 before the opposite portion 55 of rolled end 48 crushes or pinches sleeve 11 against the outer surface of piston 19. Likewise, the complete circumferential engagement of rolled ends 48 and 49 as shown in FIGS. 3 and 6, will enalbe high pressures to be used and contained within fluid chamber 38 without any danger of separating the two telescopically joined housings.

Furthermore, the sliding engagement between the two houses does not require any sealing means since the high pressure fluie is contained within fluid chamber 38 by sleeve 11 and is not exerted at the sliding area between the two movable members of the die as in prior die spring constructions using a piston and surrounding sealing ring engageable with the inner walls of a cylinder. Another feature of the invention is that the location of sealing bands 14 and 15 with respect to the ends of sleeve 11, is aided by the high internal pressure to assist the sealing action thereof instead of tending to break the seal between the sealed members. As discussed above, the high internal pressure attempts to force sealing band 15 outwardly but such movement is prevented by the inner surface of inner housing wall 46. Also the pressure pushes the lower sealing band 14 against annular grooves 35 and shoulder 37 of piston member 10.

Accordingly the improved die spring provides a device with fewer and lower cost components than with most known die constructions thereby providing a less expensive, but highly efficient device which completely eliminates the need for a sliding seal, which heretofore has been the main problem area with existing high pressure nitrogen or other pneumatic seals; which provides a longer life to the die spring due to the elimination of such sliding seals; which enables air to be used as the fluid medium without the sacrifice of operating characteristics thereof; which reduces air leakage at the sealing locations of the flexible sleeve to the piston member and upper sealing disc; and which provides more flexibility with regards to off center loading than known prior die spring constructions.

Outer housing 12 serves as a guide for inner housing 13 and could have other configurations than the cylindrical shaped shown in the drawings since it does not absorb or restrain any of the fluid pressure. Inner housing 13 likewise could have other shapes but cylindrical is preferred since this enables wall 46 to equally restrain the radial outward pressure exerted by the fluid thereon. Likewise, upper end 32 of sleeve 11 can be sealed by other means than disc 16 and band 15 provided that the external fluid is prevented from escaping therefrom.

A modified embodiment of the improved die spring is indicated generally at 57, and is shown particularly in FIGS. 7 and 8. Die 57 is similar in most features to that of die spring 1 described above. The upper end of internal piston 58 is tapered at 59 to provide a smooth transition for the rolled end 60 of flexible sleeve 11, and hollow interior 61 of piston 58 may extend axially further into the piston than that shown in FIGS. 3 and 4 of piston 19.

In accordance with one of the features of modified die spring 57, a pair of stop rings 63 and 64, one of which is shown in elevation in FIG. 9, are brazed onto the peripheral inner edge of cylindrical wall 65 of outer housing 66 and to the outer lower peripheral end of cylindrical side wall 67 of inner housing 68. As shown in FIG. 7 the diameters of rings 63 and 64 are chosen so that the rings abut each other to provide a mechanical stop to the outward movement of inner housing 68 upon reaching the fully extended position, in somewhat similar manner as do annular rolled edges 48 and 49 of die spring 1.

Stop rings 63 and 64 are formed of brass or bronze so as to provide a different metal than that of the steel material from which housing walls 65 and 67 are formed. This dissimilar metal reduces the galvanic corrosion and wear effect which occurs between the sliding engagement of two similar metals, in contrast to the effect between the sliding action of dissimilar metals, such as the steel and bronze or brass materials. For certain applications, the use of separated stop rings 63 and 64 in contrast to the integrally formed rolled edges 48 and 49 of die spring 1, facilitates the manufacture and assembly of modified die spring 57, while providing the same stop and off-center restraint to the die spring in a similar manner as do the rolled edges of die spring 1. If desired, modified die spring 57 as shown in FIG. 7, may have a separate annular top wall 69 which is secured by welds 70 within the top open end 71 of inner housing 68.

In accordance with one of the main features of modified die spring 57, a coating 75 of a low friction material is applied to the interior surface of inner housing wall 67 and a similar coating 76 is applied to the outer surface of piston cylindrical wall 72. One type of friction reducing material found suitable is polytetrafluoroethylene, sold under the trasdemark Teflon which is secured to the cylindrical surfaces by bonding procedures well known in the art. These low friction surfaces facilitate the movement of the elastomeric sleeve as it moves along the surfaces in a rolling or sliding relationship as the inner housing reciprocates axially between extended and collapsed positions. It has been found that this low friction coating increases the life of the elastomeric sleeve beyond that obtained without such a coating material.

Low friction coatings 75 and 76 may be replaced with separate sleeves of low friction material indicated at 78 (FIG. 10) without effecting the concept of the invention. These sleeves may be slideably mounted and secured by means well known in the art within inner housing 68 adjacent the interior surface thereof, and telescopically about piston surface 72. The individual sleeves 78 perform the same function as the low friction coatings 75 and 76 but avoids the coating operation of the inner housing wall and piston surface. The sleeves require only the separate installation thereof during assembly of the die spring.

Modified die spring 57 provides a construction which achieves the same advantages as that of die spring 1 described above. Furthermore spring 57 enables separate stop rings formed of a dissimilar metal, to be mounted on the respective walls of the inner and outer housings to provide an axial stop while reducing the galvanic corrosion effect, and reduces the sliding and rolling friction between the elastomeric sleeve and the inner housing surface and piston outer surface to extend the life of the elastomeric sleeve without sacrificing any of the advantages achieved by die spring 1 as described above.

Accordingly, the die spring construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved die spring construction is constructed and used, the characteristics of the construction, and the advantageous, new and useful results obtained; the new and useful structures, devices, elements, arrangements, parts, and combinations, are set forth in the appended claims.

What is claimed is:

1. A pneumatic shock absorbing device including:
   (a) a piston member having a base and an upstanding cylindrical body formed with an interior gas reservoir;
   (b) an outer housing mounted on the base of the piston member and extending about at least a part of the body of said piston member;
   (c) an inner housing mounted for telescopic slideable movement within the outer housing and movable from a normal extended position toward a retracted position upon an axial force being applied to the inner housing;
   (d) a flexible elastomeric sleeve having a pair of open ends sealingly connected at one open end to the exterior of an outer end of the piston member body and enclosed at the other end by an end cap;
   (e) opening means formed in the piston member for admitting pressurized gas into the reservoir;
   (f) a pair of annular metallic stop rings secured to the interior of an open end of the outer housing and to the exterior of an open end of the inner housing, said rings being engageable with each other when the inner housing is in maximum extended position, each of said housings being formed of a metal dissimilar to the metal of its respective stop ring; and
   (g) a coating of a low friction material applied to an interior surface of the inner housing and to an exterior surface of the body of the piston member engageable with the flexible sleeve for reducing the frictional contact therebetween as the inner housing moves between the extended and retracted positions.

2. The die spring construction defined in claim 1 in which the end cap engages an end wall of the inner housing upon axial expansion of the sleeve by pressurized gas to move said inner housing toward the extended position.

3. The die spring construction defined in claim 1 in which the base and body of the piston member and the inner and outer housings are cylindrical; in which ends of the flexible sleeve are connected to the body of the piston member and end cap by annular sealing bands.

4. The die spring construction defined in claim 3 in which the outer diameter of the end cap and sealing band therefore is complementary to the inside diameter of the inner housing whereby the inner housing restrains outward movement of said sealing band.

5. The die spring construction defined in claim 4 in which the end cap has a cylindrical side wall formed with a series of annular groves for trapping the flexible sleeve therein.

6. The die spring construction defined in claim 1 in which upstanding cylindrical body of the piston member is formed with an inwardly conical tapered area surrounding an open end of said body.

7. A pneumatic shock absorbing device including:
   (a) a piston member having a base and an upstanding cylindrical body formed with an interior gas reservoir;
   (b) a cylindrical outer housing mounted on the base of the piston member and extending about at least a part of the body of said piston member;
   (c) a cylindrical inner housing mounted for telescopic slideable movement within the outer housing and movable from a normal extended position toward a retracted position upon an axial force being applied to the inner housing;
   (d) a flexible elastomeric sleeve having a pair of open ends sealingly connected at one open end to the exterior of an outer end of the piston member body and enclosed at the other end by an end cap;
   (e) mutually engageable continuous rolled peripheral rigid annular edges formed integrally with the inner and outer housings for stopping the sliding movement of the inner housing upon reaching the extended position and to limit lateral movement between the inner and outer housings during said sliding movement; and
   (f) a coating of a low friction material applied to an interior surface of the inner housing and to an exterior surface of the body of the piston member for engagement with the flexible sleeve for reducing the frictional contact therebetween as the inner housing moves between the extended and retracted positions.

8. The die spring construction defined in claim 7 in which the upstanding cylindrical body of the piston member is formed with a conical downwardly tapered surface surrounding an open end of the gas reservoir; and in which the flexible sleeve has a rolled end which extends along the conical surface of the piston member cylindrical body when the inner housing is in the extended position.

9. The die spring construction defined in claim 7 in which the low friction material is polytetrafluoroethylene, sold under the trademark Teflon.

10. The die spring construction defined in claim 7 in which the inner housing has an end wall and is abuttingly engaged by the end cap to place said inner housing in the normal extended position.

11. The die spring construction defined in claim 7 in which the end cap has a cylindrical side wall formed with a series of annular grooves for connecting the flexible sleeve to the end cap by an annular sealing band.

* * * * *